(12) United States Patent
Kartes

(10) Patent No.: US 8,666,595 B2
(45) Date of Patent: Mar. 4, 2014

(54) ONE-TOUCH CONTROLLER FOR TARP SYSTEMS

(75) Inventor: Scott Kartes, West Branch, MI (US)

(73) Assignee: Roll-Rite, LLC, Alger, MI (US)

( * ) Notice: Subject to any disclaimer, the term of this patent is extended or adjusted under 35 U.S.C. 154(b) by 101 days.

(21) Appl. No.: 13/368,939

(22) Filed: Feb. 8, 2012

(65) Prior Publication Data

US 2013/0204461 A1    Aug. 8, 2013

(51) Int. Cl.
*G06F 7/00* (2006.01)

(52) U.S. Cl.
USPC .............................. 701/36; 701/50

(58) Field of Classification Search
USPC ................... 701/2, 36, 50; 700/275
See application file for complete search history.

(56) References Cited

U.S. PATENT DOCUMENTS

| | | | | |
|---|---|---|---|---|
| 3,633,073 | A * | 1/1972 | Day et al. | 361/22 |
| 5,031,955 | A | 7/1991 | Searfoss | |
| 5,328,228 | A | 7/1994 | Klassen | |
| 5,829,819 | A * | 11/1998 | Searfoss | 296/98 |
| 5,924,758 | A | 7/1999 | Dimmer et al. | |
| 6,206,449 | B1 | 3/2001 | Searfoss | |
| 6,484,069 | B2 * | 11/2002 | Osinga | 700/275 |
| 6,732,018 | B2 * | 5/2004 | Osinga | 700/275 |
| 6,916,060 | B2 | 7/2005 | Searfoss | |
| 7,163,207 | B2 * | 1/2007 | Baird et al. | 280/6.153 |
| 7,408,274 | B2 | 8/2008 | Sullivan et al. | |
| 7,453,224 | B2 | 11/2008 | Sullivan | |
| 7,468,876 | B2 | 12/2008 | Sullivan | |
| 7,594,687 | B2 | 9/2009 | Searfoss | |
| 7,672,106 | B1 | 3/2010 | Sullivan | |
| 7,726,720 | B2 | 6/2010 | Searfoss | |
| 7,866,725 | B1 | 1/2011 | Searfoss et al. | |
| 7,967,364 | B1 | 6/2011 | Kartes | |
| 8,058,700 | B1 | 11/2011 | Sullivan | |
| 2008/0239451 | A1 * | 10/2008 | Mitchell et al. | 359/265 |
| 2011/0203865 | A1 | 8/2011 | Knight et al. | |

OTHER PUBLICATIONS

Razor International Pty Ltd, Razor Power Tarp Operating Instructions, Razor International, Victoria, Australia [admitted prior art]. 2011, available online @ http://web.archive.org/web/20111226124721/http://www.razorinternational.com/perch/resources/razorrollovertarpoperatinginstructions.pdf, last accessed Jul. 14, 2013.

Razor International Pty Ltd, Razor Power Tarp Bronchure, Razor International, Victoria, Australia [admitted prior art]. 2011, Available online @ http://web.archive.org/web/20111226124725/http://www.razorinternational.com/perch/resources/rollover.pdf, last accessed Jul. 14, 2013.

* cited by examiner

*Primary Examiner* — Behrang Badii
*Assistant Examiner* — Daniel L Greene
(74) *Attorney, Agent, or Firm* — Miller Canfield Paddock and Stone; Timothy J Engling

(57) ABSTRACT

A one-touch controller for a tarp system with varying phases or modes based on a single touch to operate. The one-touch controller module controls a motor of a tarp, such as a geared brake motor, and a switch or a remote control system with a button to push to operate a vehicle tarp system with one touch of the button. The one-touch controller preferably has solid state circuitry that controls power to and direction of the motor and detects amp variations from the motor to automatically shut off the system. The remote control system preferably operates in various modes based on how long the button of the remote control is touched, such as with short touches of the button being incremental operation, other touches permitting the entire cycle in automatic operation, and touches longer than a set time being "press and hold" operation.

14 Claims, 4 Drawing Sheets

ONE-TOUCH CONTROLLER FOR TARP SYSTEMS

FIELD OF THE DISCLOSURE

This disclosure relates to a one-touch controller for tarp systems. More specifically, the disclosure relates to a controller that can be operated via a wired or wireless switch with various phases or modes for controlling the motor of a tarp system.

BACKGROUND

Trucks and cabs pull trailers that often have tarp systems. Tarps are well known for covering contents of a container of the trailers during transport. A tarp system with a movable tarp, such as a roll tarp, is adapted to cover contents of a container.

Power solutions for tarp operation are important for safety and efficiency. One goal is to keep the trailer operators in the cab or on the ground, rather than manually rolling and unrolling the tarp from a catwalk on the front of a container. Remote operation has been a desirable option on power solutions to enhance operator safety and efficiency. Fully automatic operation can greatly improve efficiency and further prevent undesirable operation introduced by an operator.

Apparatus have been devised for covering a truck load. Some such apparatus include an electric motor for selectively winding a flexible cover. U.S. Pat. No. 5,031,955 provides a truck cover that may be motor-operated from the cab of a truck to extend the cover from a winding assembly proximate the front of the truck bed and forward the rear of the truck bed. It discloses a direct drive spool winding system with an automatic self-brake feature with the 90 degree relationship of the worm gear with respect to the drive bolt threads.

U.S. Pat. No. 5,829,819 discloses an electric tarp system with a direct-drive actuator assembly that actuates a tarp spool for a truck bed tarp system. An output shaft extends from a transmission housing for driving a tarp spool. An electric motor is operatively connected to an input shaft for actuating the tarp spool. A brake is operatively connected to the electric motor for automatically braking the motor when the electric motor is turned off. A brake motor is used with a transmission having high efficiency gears that are not self-braking.

U.S. Pat. No. 7,163,207 entitled "Demountable drive mechanism" has some suggestions about remote control to control operation of an electric motor for a tarp system. FIG. 25 shows a wireless remote control unit that is installed to operate the drive mechanism via wireless remote switching. The wireless remote receiver and controller 741 is typically mounted adjacent the geared motor 200 and the battery 136 on the truck or trailer chassis. The wireless controller is provided with 12 volt power from the battery 136 of the drive mechanism. The harness connectors 742 and 743 connecting the remote keypad 169 to the geared motor 200 is routed via the wireless controller 741. A small wireless transmitter 744 is used in conjunction with the wireless remote receiver and controller 741. Typically, the transmitter 744 may be stored on an operator's key ring or the like.

The operation of the wireless remote embodiment is achieved by depressing the buttons on the transmitter 744. The wireless controller 741 receives the signal. The controller 741 incorporates electronic circuitry, which was of standard technology known in the industry at that time. It activates the device by mimicking the remote keypad 169 functionally. Electric motor current can be measured by a standard shunt circuit, and rapid increases in electric motor current shut down the motor to stop operation of a tarp system.

For a RAZOR wireless remote controller for a truck cover, one version of the "RAZOR Power Tarp Operating Instructions" includes button operation, but a Note states the "wireless remote operates off a momentary signal. The buttons are not to be held for longer than 2 seconds at a time as this may cause the remote to become inoperable." The remote control operates with a press and release a button to start and press and release opposite button to stop.

Automobile windows (using lower amps) have been developed for various phases for controlling a passenger window. Window button have touches permitting short incremental movement of the window and the entire cycle in one operation to allow a window or go completely up or down. Also, window systems have overcurrent shut-down when something obstructs the window movement.

Several U.S. Patents may relate to 12 and 24 volt motor controller modules including:
- U.S. Pat. No. 7,672,106 Switching incandescent lamps and other variable resistance loads with a solid state, smart, high side driver having overcurrent and temperature sensing protection circuits,
- U.S. Pat. No. 7,468,876 Safety switch,
- U.S. Pat. No. 7,453,224 Sensing mechanical transitions from current of motor driving hydraulic pump or other mechanism, and
- U.S. Pat. No. 7,408,274 Control and operating condition monitoring of dual series switch contactors for electric motor or other electrical loads.

Also, U.S. Pat. No. 8,058,700 applies to a 24 volt motor control module regarding surge overcurrent protection for solid state, smart, high current, power switches.

SUMMARY

The present disclosure provides a one-touch controller for a vehicle tarp system. This system is well suited for remote operation. The tarp system includes some conventional components, such as a tarp, a brake motor or a knuckle arm assembly, to operate the tarp system.

The disclosed one-touch controller for a tarp system preferably operates based on how long the button is held and changes whether or not the output is latched or unlatched, unlike the Razor system. Also the amperage detection scheme is different. The sensing of amp spikes assists in shutting off the motor automatically in operating a tarp system.

The controller allows short touches of a button resulting in incremental operation, longer touches permitting the entire cycle in one operation, and touches longer than a set time being "press and hold" operation. If the button of the disclosed remote control is held for more than two and a half seconds, it can be a press-and-hold operation.

The one-touch controller controls a motor of a tarp system with a module associated with the motor, such as a geared brake motor, and a switch or a remote control with a button to push for operation of the vehicle tarp system with one touch of the button. The one-touch controller preferably has solid state circuitry and hardware to detect amp variations, such as spikes, from the motor to automatically shut off the tarp system. The circuitry to operate the motor can be synched in the off condition with the application of the brake, which is used in combination with gear motor combination that are not self-braking.

Operators can safely and efficiently open and close their power tarp systems from their cab or while watching their truck from a distance by using a one-touch controller. The switch or wireless remote control allows operators to open and close with one quick touch of a button. The tarp system can completely open and close automatically with the ability to start and stop as needed and/or to operate as a "press and hold" button.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
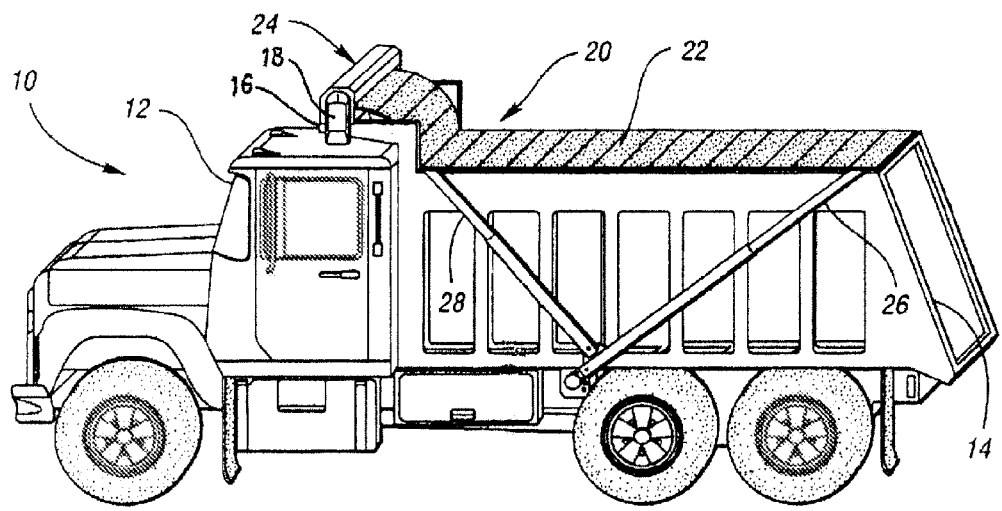
FIG. 1 shows a side perspective view of a truck with a prior art electric tarp system from U.S. Pat. No. 5,829,819.

From U.S. Pat. No. 5,829,819, FIG. 1 shows a conventional truck 10 having a cab 12 and a truck bed 14. An electric tarp system 20 is shown on the truck 10 for covering the truck bed 14 with an electric brake motor 16 operatively connected to a transmission housing 18 for operating the tarp 22. The electric tarp system 20 includes a flexible cover or tarp 22, a winding assembly 24 for winding and storing cover 22, an extension assembly 26 for extending the cover 22 over the truck bed 14, and a tension assembly 28 for applying a downward force on the cover 22. This is just an example of a tarp system, and the one-touch controller disclosure may also be used with a side-to-side tarp system with a motor mounted on a knuckle arm.

Automated systems that cover the truck bed 14 from side to side are known. For instance, U.S. Pat. No. 5,328,228 shows a cover for truck bed and cargo. Similarly, U.S. Pat. No. 5,924,758 shows a roll assist mechanism for tarp systems. U.S. Pat. No. 6,206,449, the disclosure of which is hereby incorporated by reference, shows a side-to-side truck cover system including a pair of arms, each of which includes a base and an extension.

Figure 2:
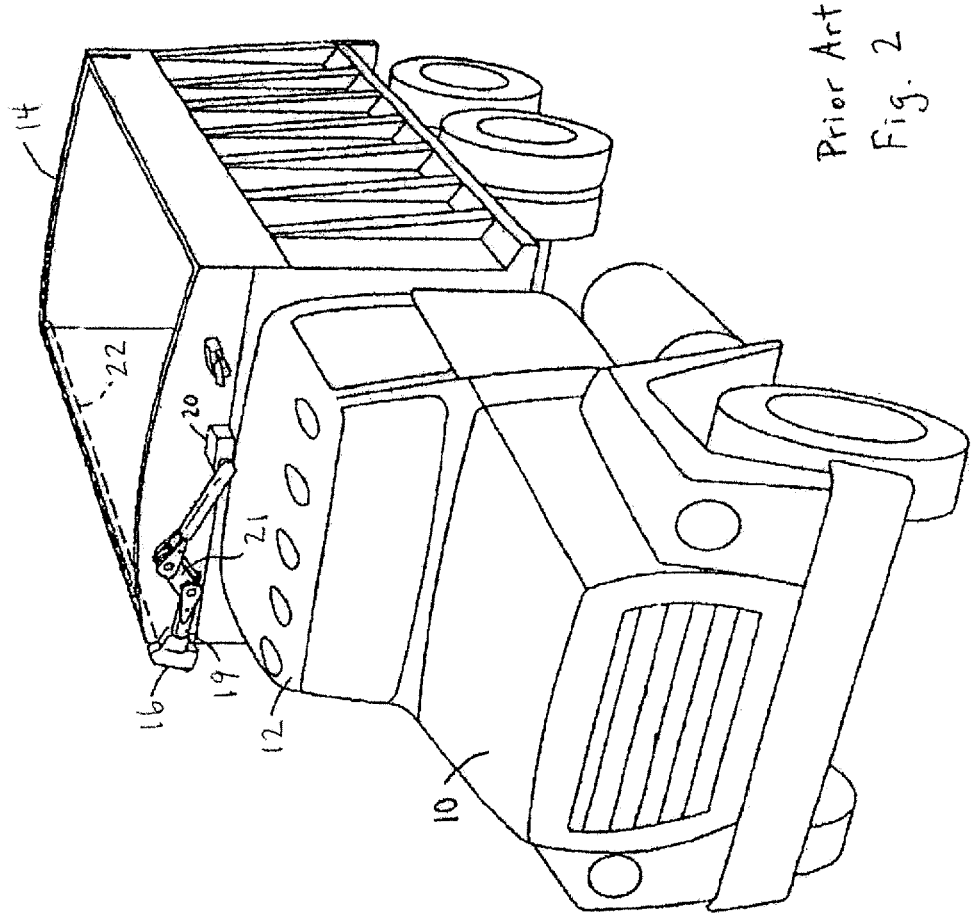
FIG. 2 shows a prior art side-to-side truck cover system.

As renumbered in FIG. 2, U.S. Pat. Nos. 7,726,720 and 6,916,060 show a motor 16 mounted on the distal end of the arm extension 19. A cover 22 on rotatable reel extends from the motor 16, and that is operatively connected to one end of the cover 22 so as to function as a take-up spool. The motor 16 is preferably provided with a brake, which allows, among other things, for the tarp system 20 to remain in the stowed or uncovered position. When the motor 16 is powered and the brake is released, the base arm 21 swings toward a side of the trailer or truck bed. The motor 16 may be powered, from within or without the cab 12 of the truck 10, to facilitate operation. Further details of one embodiment of the motor are taught by U.S. Pat. No. 5,829,819, which is hereby incorporated by reference. In this way, the cover 22 is pulled off of the reel and extended over the trailer or truck bed. The motor 16 can be reversed to drive the reel and retract the cover 22 against the tension force of the springs to uncover the load bed.

The one-touch controller module 30 allows for one-touch control of vehicle tarp systems 20. A one-touch controller module 30 may be used in conjunction with a wireless remote control system 31 (such as a remote control transmitter 32 and a RF module 33) or a switch 35. The controller module 30 preferably incorporates a motor reversing relay 34 associated with the motor 16, which is preferably a brake motor. The remote control system 31 or switch 35 allow manual control with one or more buttons 36 to push for operation. The buttons 36 of a remote control transmitter 32 may be in a sealed membrane for weather resistance. The wireless remote control system 31 or switch 35 allows operators to open and close the tarp 22 with one quick touch of a button.

Figure 3:
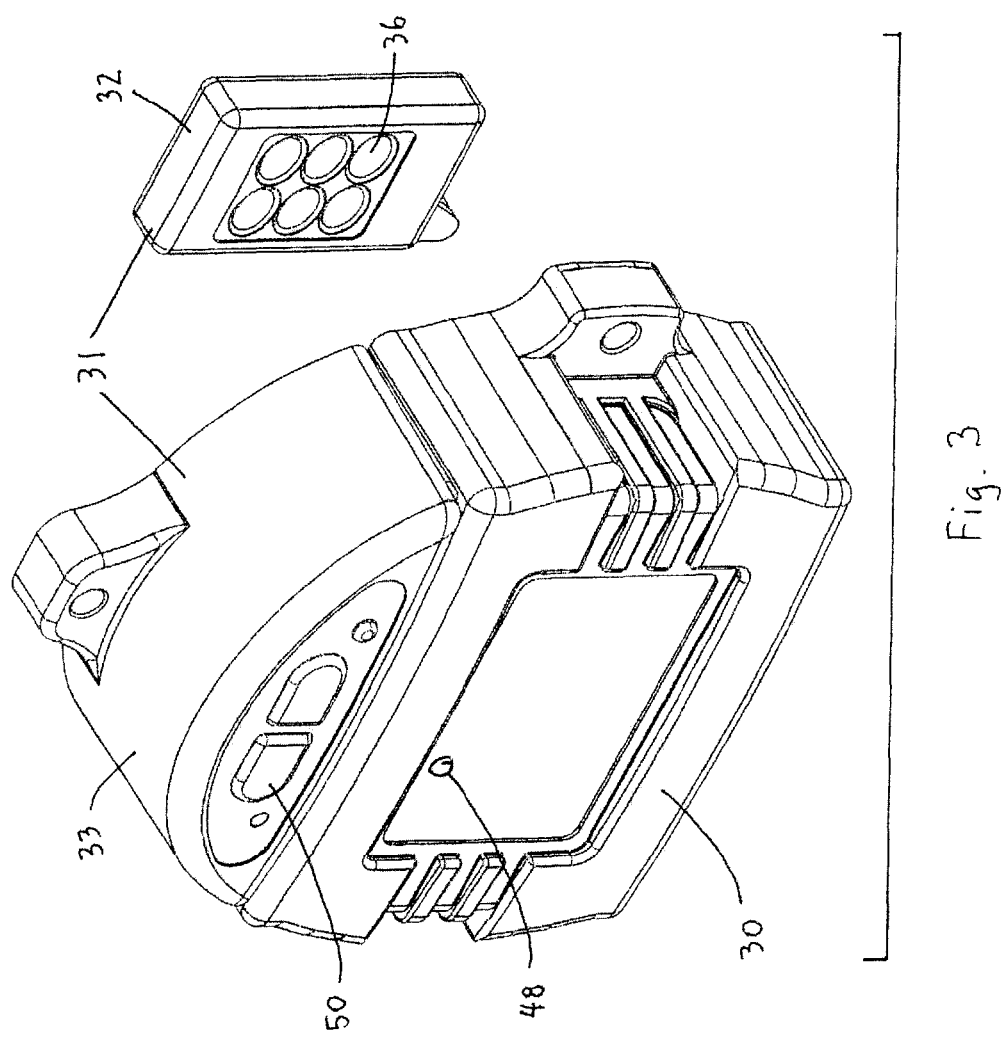
FIG. 3 shows a perspective view of a remote control and a RF module mounted on a controller module.

FIG. 3 shows a remote control transmitter 32 with buttons 36 and a RF module 33 physically mounted on the controller module 30. While the relay that runs the one-touch controller module 30 could operate with a mechanical switch 35, such as a three-position momentary switch, an electronic RF module 33 is preferred for remote control operation with use of a remote control transmitter 32.

The one-touch controller module 30 ideally operates based on how long the button 36 of the remote control transmitter 32 or switch 35 is held by touching, including holding or pressing. The controller module 30, such as with one-touch functionality with an SPDT switch, allows three operational modes or phases with short touches (i.e. holding the button) being incremental operation, longer touches permitting the entire cycle in one automatic operation, and touches longer than a set time being standard "press and hold" operation. For an example controller module 30 if the button 36 is held for more than two and one half seconds, it operates as press-and-hold. In three operational modes, the short touches of the button, for instance ¾ second (750 ms), will result in incremental operation; other medium-length touches of the button, for instance between ¾ second and 2.5 seconds, can permit the entire cycle in one operation; and touches of the button longer than a set time, such as more than two and one half seconds, can allow traditional "press and hold" operation. The tarp system 20 can completely open and close automatically with the ability to start and stop as needed and/or to operate as a "press and hold" button.

For a preferred brake motor 16 used with tarp systems 20, the brake is applied on the off cycle of the sequence. The braking circuitry of the controller module 30 is unique so the tarp or cover 22 does not move from its stowed or open position when synched in the off position with the brake being applied. As such, during movement of the tarp 22, the brake associated with the motor 16 can be released by power release of a spring-applied brake.

A motor reversing relay 34 can be associated with the brake motor 16 as part of the controller module 30 to receive signals from the remote control system 31.

An example smart motor reversing relay 34 can have many features, including overcurrent protection for 12V systems, detection of low voltage and over voltage, and detection of "no load"/miswired/short circuit. Intelligent motor protection can be built into controller module 30 to prevent motor windings from overheating or accumulating thermal damage.

Other specifications of the relay 34 may include (1) short circuit and ignition protection, (2) an operating voltage of 7.5V to 15.5V at no load, (3) an Inrush current: capability to handle motor with inrush of up to 300 A, and (4) an operating temp range (minimum): −20 C to 65 C. The relay 34 preferably uses positive switching.

A spade terminal interface for SPDT low voltage momentary (on)/off/(on) input switch. Forward and Reverse inputs should be active high (to +12V) as compatible with vehicle systems.

Preferably, the relay 34 can be capable of operation without the use of a circuit breaker to protect it. If a breaker or fuse is necessary, it is shown on the electric diagram of FIG. 4 as a circuit breaker 38.

Figure 4:
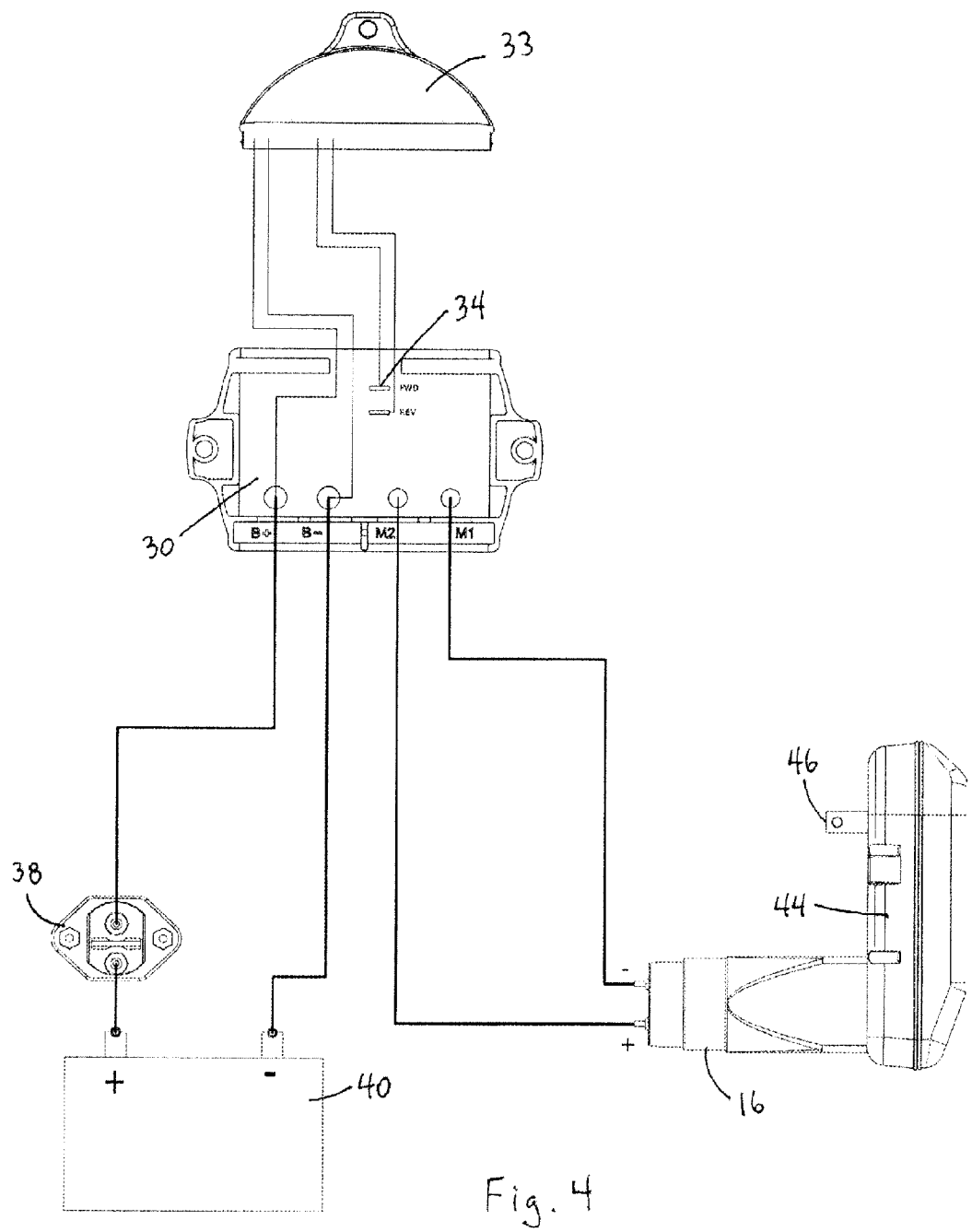
FIG. 4 shows an electric diagram with a power source, a controller module, an RF module and a motor.

FIG. 4 an electric diagram with a power source 40, the back of controller module 30, an RF module 33 and the motor 16. The power source 40 can be a battery or starter per OEM desires on the vehicle or various other sources. A circuit breaker 38 is shown wired to the power source 40 to protect the wire between the power source 40 and the controller module 30. The power source 40 is wired to posts B+ and B− on the controller module 30 that includes a preferred motor reversing relay 34. The controller module 30 is also wired via M1 and M2 to the brake motor 16, shown with a transmission housing 44 with an output shaft 46 that could operationally connect to a tarp system 20.

The RF module 33 is also shown as wired to the controller module 30. Two wires attach to posts B+ and B− of the controller module 30. Two other wires connect to spades FWD and REV on the controller module 30 associated with the motor reversing relay 34. While the RF module 33 is schematically distant from the controller module 30, the RF module 33 can be clipped to the controller module 30 with wires routed through an aperture or cutout in the controller module 30.

A one-touch controller module 30 can control motor operation wherein the controller module 30 has circuitry that detects amperage from the motor 16 for automatic shut off of the tarp system 20 and software that allows for different motor operational modes based on duration of input power from a remote control system 31 or switch 35.

The preferred controller module 30 includes circuitry to detect amperage associated with the brake motor 16. Solid state circuitry controls power to and direction of the motor 16. Solid state circuitry ideally detects and measures amp variations or amp spikes from the motor 16 to shut off the tarp system 20. The preferred solid state controller module 30 includes an automatic shutoff when an amp spike in the motor 16 operation is detected during normal operation. The amperage detection scheme by sensing of amp spikes assists in shutting off the motor 16 automatically in remotely operating a tarp system.

Preferred programmed protection modes for 12V operation can be:

| Mode | Amp Range | Function |
| --- | --- | --- |
| A | N/A | Check for Open load/miswired/short circuit condition |
| B | ALL | Intelligent motor overheating protection |
| C | 50A | Allow running for set duration (module self-protection) |
| D | 80A | Allow running for set duration (system overload protection) |

On the front of the controller module 30, there is preferably an LED indicator light 48. Preferred LED activity for 12V operation can be:

| LED Activity | Condition | LED Duration |
| --- | --- | --- |
| Solid | Operating normally | During normal operation |
| 2 Flash | System protection | Code will repeat twice then reset |
| 3 Flash | Module self-protection | Code will repeat until next button press |
| 4 Flash | Motor overheat protection | Code will repeat until next button press |
| 5 Flash | Over voltage protection (V > 15.5 v) | Code will repeat until next button press |
| 6 Flash | Under voltage protection (V < 7.5 V) | Code will repeat until next button press |
| 7 Flash | Wiring fault (no load, miswired, short) | Code will repeat until next button press |

The RF module 33 is shown mounted on the control module 30 in FIG. 3. As prudent LED indicator lights can be incorporated into the RF module 33 also. The RF module can be turned on or off by pressing and holding both on/off buttons 50 as shown on the front of the RF module 33.

The controller module 30 preferably uses certain circuitry similar to that disclosed in InPower's U.S. Pat. Nos. 8,058,700; 7,767,106; 7,468,876; 7,453,224; and 7,408,274, which are incorporated by reference. Other solid state circuitry may include a motor reversing relay, wherein the circuitry controls power to and direction of a brake motor with a brake applied on the off cycle. As part of dynamic braking, motor terminals can be shunted when power is not applied, which can be used in association with brakes of a brake motor 16.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. A tarp system having a one-touch module for controlling operation of a motor comprising:
   a movable tarp adapted as a cover;
   the motor operates movement of the tarp;
   the one-touch module controls motor operation wherein the module has circuitry that detects variations in amperage from the motor for automatic shut off of the tarp system and software that allows for different motor operational modes based on differing duration of input from a switch.

2. The tarp system of claim 1 wherein the switch is a mechanical switch or an electronic RF module.

3. The tarp system of claim 1 wherein the one-touch module has solid state circuitry including a motor reversing relay, wherein the circuitry controls power to and direction of the motor.

4. The tarp system of claim 3 wherein the motor is a brake motor wherein a brake is applied on the off cycle.

5. The tarp system of claim 1 including a remote control with a button to push to operate in various modes based on how long the button of the remote control is touched with the ability to start and stop as needed and to operate as a "press and hold" button.

6. The tarp system of claim 5 wherein the one-touch module operates in three modes with short press and release of the button being incremental operation, other touches of the button permitting the entire cycle in one operation, and touches of the button longer than a set time being "press and hold" operation.

7. The tarp system of claim 5 wherein the motor is a brake motor wherein a brake is applied on an off position of the sequence by a braking circuit of the one-touch module so the tarp does not move from its stowed or open position when synched in the off position with the brake being applied.

8. A one-touch controller for a motor of a vehicle tarp system comprising:
   a controller module with a motor reversing relay;
   an RF system as a switch associated with operating the motor; and
   a remote control with a button to push for operation of the vehicle tarp system with one touch of the button, wherein the remote control operates in different modes of controlling the motor based on how long the button of the remote control is touched, and
   wherein the controller module has solid state circuitry that detects amp variations from the motor to automatically shut off the vehicle tarp system.

9. The controller of claim 8 wherein the controller operates in three modes with short touches of the button of the remote control being incremental operation, other touches of the button permitting the entire cycle in one automatic operation, and touches of the button longer than a set time being "press and hold" operation.

10. The controller of claim 9 wherein the set time for "press and hold" operation is more than two and a half seconds and incremental operation is a result of pressing and releasing the button of the remote control.

11. The controller of claim 8 wherein a braking circuit of the controller module synchs in an off position with a brake being applied to the motor to control movement of the tarp system.

12. The controller of claim 8 wherein the motor reversing relay includes overcurrent protection for a 12 volt system with a visual overcurrent indicator on the controller module.

13. The controller of claim 8 wherein the RF system is an RF module that is activated via a single touch of the button of the remote control and the RF module is wired to the motor reversing relay in the controller module that is a separate component than the RF module.

14. The controller of claim 8 wherein the amp variations being detected are amp spikes.

* * * * *